United States Patent [19]

Krude et al.

[11] Patent Number: 4,525,098
[45] Date of Patent: Jun. 25, 1985

[54] ASSEMBLY FOR CONNECTING TOGETHER TORQUE-TRANSMITTING MEMBERS

[76] Inventors: Werner Krude, Am Sonnenhang 10a, 5200 Siegburg-Kaldauen; Alfons Jordan, Uckerather Str. 88, 5202 Hennef; Peter Harz, Steinbruchstr. 14, 5202 Hennef 41, all of Fed. Rep. of Germany

[21] Appl. No.: 446,955

[22] Filed: Dec. 6, 1982

[30] Foreign Application Priority Data

Dec. 15, 1981 [DE] Fed. Rep. of Germany ....... 3149596

[51] Int. Cl.³ .............................................. F16B 00/00
[52] U.S. Cl. .................................. 403/280; 403/281; 403/283; 403/285; 285/256; 285/382
[58] Field of Search ............... 403/283, 280, 281, 285, 403/274, 405; 29/517, 432; 285/382, 256

[56] References Cited

U.S. PATENT DOCUMENTS

| | | | |
|---|---|---|---|
| 1,179,853 | 4/1916 | McCulloch | 403/283 X |
| 2,073,338 | 3/1937 | Durkee | 403/281 X |
| 2,329,653 | 9/1943 | Rogoff | 403/285 X |
| 2,576,528 | 11/1951 | Matthysse | 403/283 X |
| 3,417,456 | 12/1968 | Carlson | 285/382 X |
| 4,073,514 | 2/1978 | Pate | 285/340 X |

FOREIGN PATENT DOCUMENTS

| | | | |
|---|---|---|---|
| 561128 | 10/1932 | Fed. Rep. of Germany | 285/382 |
| 813333 | 9/1951 | Fed. Rep. of Germany | . |
| 871230 | 2/1953 | Fed. Rep. of Germany | . |
| 1816854 | 12/1968 | Fed. Rep. of Germany | . |
| 1952862 | 2/1973 | Fed. Rep. of Germany | . |
| 90020 | 5/1972 | German Democratic Rep. | . |
| 297932 | 6/1954 | Switzerland | 403/285 |
| 1354111 | 5/1970 | United Kingdom | . |

Primary Examiner—Richard J. Scanlan, Jr.

[57] ABSTRACT

A pair of torque-transmitting members are joined together in torque-transmitting relationship at an inner and outer tubular connecting part of each by connecting elements interposed within an annular recess formed between said inner and outer connecting parts, said connecting elements having acuminated portions and being formed of a material harder than the material of the connecting parts in order to penetrate the surface thereof when the connecting parts are pressed together thereby to hold the first and second members in torque-transmitting engagement.

9 Claims, 13 Drawing Figures

ASSEMBLY FOR CONNECTING TOGETHER TORQUE-TRANSMITTING MEMBERS

The present invention relates generally to assemblies for connecting together two parts and more particularly to an assembly for connecting together a pair of torque-transmitting members wherein each of the members is formed with a connecting part fitted one into the other. The parts which are connected together by the present invention may, for example, be shaft parts which are joined together for torque transmission.

Structures of the type to which the present invention relates are known in the prior art for example from British Pat. No. 1 354 111 wherein there is disclosed a connection between a constant velocity ratio universal joint and a tubular drive shaft in which the outer member of the joint fits in the end of a drive shaft which is deformed inwardly to engage recesses in the external surface of the joint outer member. The joint outer member is provided with axially extending grooves for torque transmission and with a circumferential groove to provide axial security. However, great accuracy in the production of the joint outer member is required and special pressing tools are needed in order to press the shaft into the formations on the joint member. Furthermore, constraints arise with regard to the design of the joint outer member due to the required shape of its internal cavity which must receive the balls or rolling members for torque transmission with the inner joint member.

In addition, it is well known from German Pat. No. 813 333 to connect shaft elements together by flanged members which are joined by a bolted connection. The purpose of such connections is to avoid relative movement between the parts and therefore an intermediate layer is provided between the components which is formed with hardened teeth in order to effect a locking action when the flanges are bolted together. German Offenlegungsschrift No. 1 816 854 discloses a bolted connection which may be unfastened and which also is provided with an intermediate layer equipped with shearing elements. These shearing elements are introduced into the intermediate layer between two flanges which when mutually tightened by the bolted connection cause penetration of the shearing elements into the intermediate layer thereby preventing relative movement. Such bolted connections require connecting faces in the reference plane and are therefore normally provided on the end faces or flanges of cylindrical members.

The present invention is particularly directed toward the provision of a structure for joining together a pair of torque-transmitting parts in a manner whereby the assembly may be produced as a reasonably priced and economical connection between rotating parts where irrespective of the diameter tolerances of the components to be connected, a permanent connection which cannot be unfastened is obtained.

Thus, the invention is directed toward provision of a cost effective and economical connection between rotating parts wherein the permanent connection therebetween is achieved without requiring adherence to strict tolerances of the parts to be connected.

SUMMARY OF THE INVENTION

Briefly, the present invention may be described as an assembly of parts such as shafts or the like to join together in torque-transmitting relationship a first member and a second member comprising: an inner and an outer tubular connecting part formed, respectively, on each of said first and second members and arranged coaxially relative to each other with said outer connecting part being arranged circumferentially around said inner connecting part; said connecting parts being arranged to define therebetween a recess comprising an annular hollow space; a pair of annular projections arranged axially spaced apart on opposite sides of said recesses with said projections being formed either as an integral portion of one of said connecting parts or as a member separate therefrom; and connecting means interposed between said connecting parts within said recess, said connecting means consisting essentially of a plurality of small pieces having acuminated portions joined together and arranged circumferentially around said inner connecting part, said small pieces being formed of a material harder than the material of said connecting parts and operating to penetrate the surfaces of said connecting parts to hold said first and second members together in torque-transmitting relationship.

In accordance with the invention, one of the connecting parts is deformed relative to the other part and as a result the plurality of small pieces or elements of a hard material which form the connecting means will dig into adjacent surfaces of the connecting parts to hold the connecting parts together.

The hard material of the small pieces of the connecting means should be a material which is sufficiently hard that a small grain or particle thereof can dig into the material of the members to be connected together. Thus, the material must be harder than the material of the connected members and may for example be of tungsten carbide, silicon carbide or possibly even diamond. A hard steel may be a satisfactory material if the connecting parts which are to be joined together are of a relatively soft material such as for example an aluminum alloy.

A connection assembly such as that in accordance with the present invention may be used for shaft components such as the outer member of a constant velocity universal joint and a tubular drive shaft regardless of whether the shaft is of steel or aluminum. The required form-fitting connection for torque transmission and axial security of the assembly is achieved inasmuch as the hard material elements will be pressed into the surfaces of the two parts and the parts can be connected together without any undesired distortion or deformation.

The hard material elements may be supported upon a base element and the base element may be formed as a flexible member such as a metal foil, a plastic sheet or strip material. This will facilitate handling of the hard material elements and will render automatic assembly possible. As a further alternative, the hard material element may be threaded or otherwise secured onto a length of cord. As a result of this arrangement of the hard material elements upon a base member, the connecting means formed of the hard material elements may be introduced into the recess between the connecting parts in the form of a continuous string or assembly of connecting pieces thereby facilitating the joinder of the parts.

Preferably, the hard material elements are contained in the recess formed as an annular hollow space between the connecting parts. The recess may be defined by a formation such as an annular groove provided on one of the connecting parts or it may be defined by separate annular elements interposed between the connecting parts. Where an annular groove is provided on one of the connecting parts, this may be either on the inner surface of the outer connecting part or on the outer surface of the inner connecting part. Preferably, such a groove is provided on the thicker wall of the two connecting parts. The annular projections or separate annular elements will form the axial limitation of the recesses into which the connecting means are inserted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
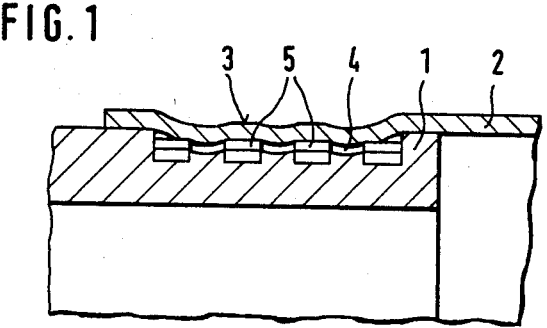
FIG. 1 is a sectional view through an assembly of connected shaft members in accordance with the present invention showing the shaft parts after deformation thereof to form the assembly.

Referring now to the drawings, and initially to FIG. 1, there is shown an embodiment of the invention which is structured in the form of an assembly or joinder of a pair of members which include an outer tubular member or connecting part 2 and an inner tubular member or connecting part 1. In the embodiment shown in FIG. 1, the outer part 2 is arranged concentrically around the inner part 1 with the outer part 2 consisting of a tubular hollow member. The exterior of the inner part 1 is formed to define therein an elongate annular recess 4 into which the outer member 2 may be inwardly deformed so that the material forming the outer member 2 may extend as shown at 3 to effect engagement with the outer part 2 by utilization of an appropriate tool.

The assembly is formed to include connecting means which are formed of a plurality of small objects shown as consisting essentially of hard material elements 5 which are circumferentially distributed and disposed in the recess 4. The hard material elements 5 are formed with acuminated parts and thus when the outer member 2 is deformed as shown at 3 in FIG. 1, the acuminated parts of the hard material elements 5 will dig into the material of both the inner and outer parts 1 and 2 after the outer part 2 has been deformed. Thus, a joinder or connection may be provided between a pair of members which may thus be placed in torque-transmitting engagement.

Figure 2:
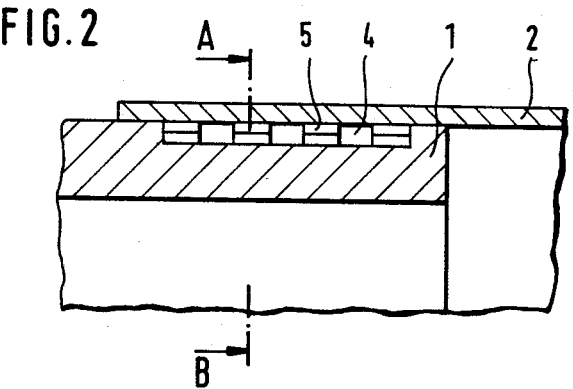
FIG. 2 is a sectional view showing the illustration of FIG. 1 prior to deformation of parts of the assembly to form the final connection.
Figure 3:
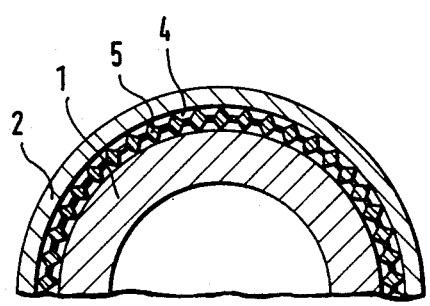
FIG. 3 is a sectional view taken along the line A-B of FIG. 2.

FIG. 2 shows the condition of the members 1 and 2 before deformation of the outer member 2. The hard material elements are shown arranged within the recess 4 and the connecting means formed of the hard material elements 5 are configured in a manner whereby the elements 5 are connected together to form a closed ring so that they may easily be arranged within the recess 4 to extend circumferentially around the inner part 1. The interposition of the connecting means comprising the hard material elements 5 between the inner part 1 and the outer part 2 is best seen in FIG. 3 which clearly shows the hard material elements 5 disposed within the recess 4. As shown in FIG. 3, the hard material elements 5 are all connected together as individual parts in such a manner that they form a closed annular member which when arranged within the recess 4 may be utilized to operate to join the members together without displacement of the hard material elements 5 relative to each other during deformation of the outer member 2.

Figure 4:
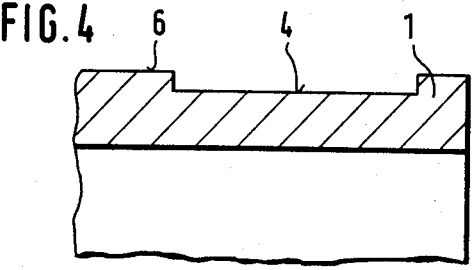
FIG. 4 is a sectional view of an inner connecting part of a connecting assembly in accordance with the invention.

FIG. 4 shows the inner member 1 prior to assembly thereof in the joinder connection of the invention. As shown in FIG. 4, the inner member 1 includes a recess 4 and is formed at an axial end of the recess 4 with a projection or annular element which defines an outer surface 6 having a diameter which is the same as the inside diameter of the outer tubular connecting part 2.

Figure 5:
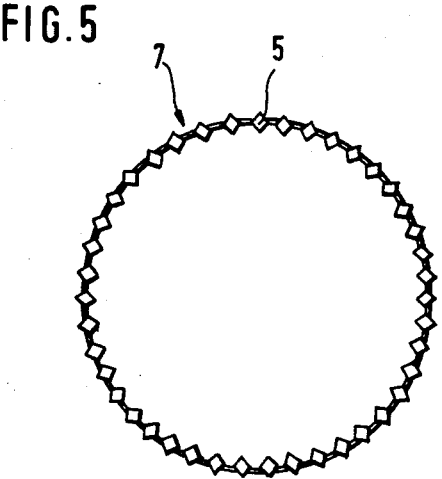
FIGS. 5 and 6 are plan views showing the connecting means of the invention formed as small pieces of hard material elements.
Figure 6:

In FIG. 5 there is shown connecting means 7 formed of a ring of plastics or metal including the hard material elements 5 joined together as indicated. Although in FIG. 5, the connecting means 7 are shown as a ring of hard material elements 5 connected together by plastics or metal material, it is also possible to form the connecting means in a configuration other than as a closed ring. For example, as shown in FIG. 6, the hard material elements 5 may be secured by a continuous flexible strip 8 of metal or plastics to form the connecting means of the invention.

Figure 7:
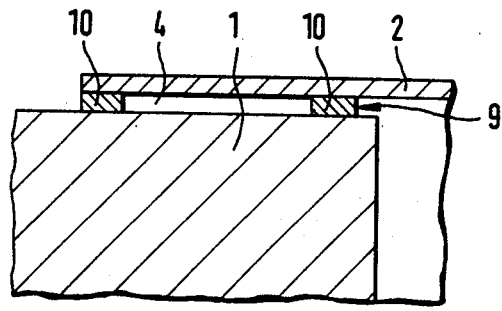
FIGS. 7 and 8 are sectional views of further embodiments of the invention.

FIG. 7 shows an embodiment of the invention wherein the recess 4 is defined at its axial ends by a pair of projections or annular elements which are formed as separate annular rings not integral with either of the inner or outer parts or 2. In FIG. 7, the inner member 1 is formed as a solid member instead of as a tubular member and the annular components forming the projections are interposed between the outer circumferential surface of the inner member 1 and the inner circumferential surface of the outer member 2 so that the annular members 10 will bridge the space 9 between the two connecting parts. Thus, during deformation of the outer connecting part 2 it is not possible for any of the material to escape laterally out of the recess 4. Of course, in FIG. 7, the material of the connecting means, i.e., the hard material elements 5 are not as yet inserted within the recess 4, but it will be understood that with the connecting means inserted in the recess 4, the parts may be deformed in the manner previously described to form the connecting joinder of the invention. The embodiment of FIG. 7 makes it unnecessary to provide a recess in the connecting part 1.

Figure 8:
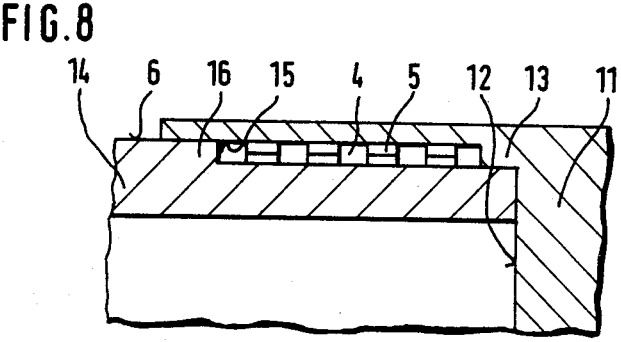

FIG. 8 shows a connection between a solid member 11 having a tubular extension 13 which serves as the outer connecting part of the assembly and which fits over an inner member 14. The outer surface 6 of the member 14 is of the same diameter as the internal surface of the free end of the tubular connecting part 13 and the free end of the member 14 abuts a face 12 of the member 11. The members have respective internal and external steps in their diameter to define the recess 4 which again receives the connecting means in the form of hard material elements 5 in the same manner as described previously. In the embodiment of FIG. 8, the projection means are formed by the parts 16 and 13 and it will be seen that the parts 16 and 13 define the axial terminations of the recess 4. Thus, after the parts 11 and 14 have been placed in assembled relationship, the hard material elements which were previously inserted into the recess 4 will now be retained in place so that the parts can be plastically deformed relative to each other in order to form the torque-transmitting connection therebetween.

Figure 9:
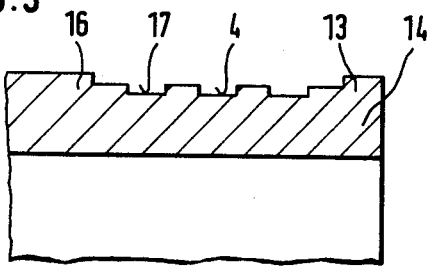
FIG. 9 is a sectional view of an inner connecting part of an embodiment assembly in accordance with the invention.

FIG. 9 shows an alternative embodiment of the inner member 14 which in principle may be used in an assembly similar to that depicted in FIG. 8. In such a case however the recess 4 will be formed with projections between which grooves 17 will receive the hard material elements. This embodiment provides greater security against axial displacement between the members after connection.

Figure 10:
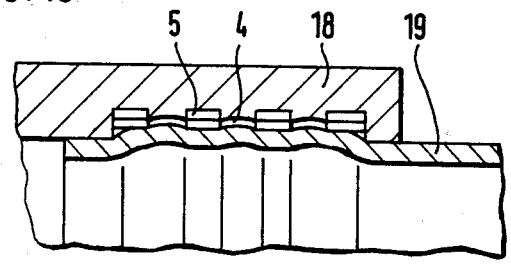
FIGS. 10 and 11 are sectional views showing further embodiments of the invention.

FIG. 10 illustrates the connection between a tubular outer connecting part 18 and an inner connecting part 19. In the case of the embodiment of FIG. 10, the member 19 is formed as a relatively thin walled part as compared with the member 18 and it is expanded so that it will engage the hard material elements 5 within an annular recess 4 formed in the interior of the member 18. Expansion of the member 19 may be effected, for example, by the application of fluid pressure within the member 19.

Figure 11:
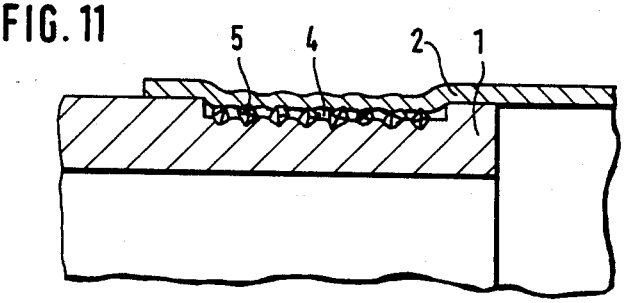
Figure 12:
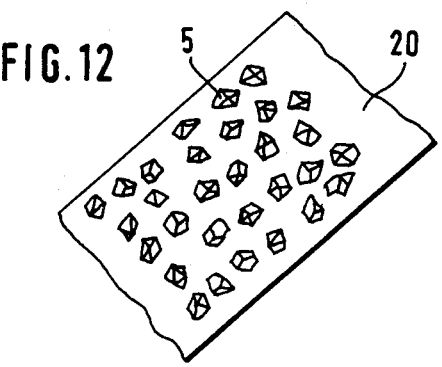
FIG. 12 is a perspective view showing an embodiment of the connecting means of the invention.

FIG. 11 illustrates another embodiment of the invention wherein an outer tubular member 2 is inwardly deformed in order to engage an inner member or part 1. As in the embodiments previously described, hard material elements 5 are arranged within a recess 4 and the hard material elements are formed so that they will dig into the material of the inner and outer members. In this case however, the hard material elements instead of being regularly distributed as in the embodiment of FIG. 1, may take the form of randomly distributed grains or particles of the hard material. Such hard material elements 5 may be held on a sheet 20 of flexible material, e.g., metal foil or plastic sheet, as shown in FIG. 12. The embodiment of FIG. 12 provides a structure wherein the connecting means embodied by the carrier material 12 and the hard material elements 5 may simply be used by unwinding from a roll or coil of such material, for example.

Figure 13:
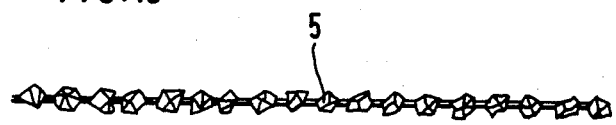
FIG. 13 is a plan view showing connecting means formed in accordance with a further embodiment of the invention.

FIG. 13 shows a variation of the construction of the connecting means wherein the hard material members 5 are fixed one behind the other in the form of a cord so that again continuous use is possible due to a suitable carrier.

In order that the members 5 be capable of digging into the surface of the parts to be connected, the hard material must be harder than the material of the connecting parts. If the parts to be connected together are of relatively soft material such as aluminum alloy, the hard material of the connecting means 5 may be of hard steel or other suitable material of equivalent hardness. On the other hand, if the parts to be connected together are formed of material such as steel, then the connecting means comprised of the hard material elements 5 will be of a harder material, for example, tungsten carbide, diamond or the like.

While specific embodiments of the invention have been shown and described in detail to illustrate the application of the inventive principles, it will be understood that the invention may be embodied otherwise without departing from such principles.

What is claimed is:

1. An assembly of parts such as shafts and the like to join together in torque-transmitting relationship a first member and a second member comprising: an inner and an outer tubular connecting part formed, respectively, on each of said first and second members arranged coaxially relative to each other with said outer connecting part being arrange circumferentially around said inner connecting part; said connecting parts being arranged to define therebetween a recess comprising an annular hollow space; a pair of projections arranged axially spaced apart on opposite sides of said recess to define the axial termination of said annular hollow space; and connecting means interposed between said connecting parts within said annular hollow space, said connecting means consisting essentially of an annular member formed separately from said inner and outer tubular connecting parts and inserted therebetween within said recess, said connecting means comprising a plurality of small connecting elements having acuminated portions joined together and arranged circumferentially around said inner connecting part, said connecting elements being formed of a material harder that the material of said connecting parts and operating to penetrate the surfaces of said connecting parts to hold said first and said second members in torque-transmitting relationship.

2. An assembly according to claim 1 wherein said connecting elements are affixed together on a base material.

3. An assembly according to claim 1 wherein at least one of said pair of annular projections is formed as an integral portion of one of said connecting parts.

4. An assembly according to claim 1 wherein at least one of said pair of annular projections is formed as a separate member from said connecting parts.

5. An assembly according to claim 1 wherein said pair of annular projections consists of a pair of rings having an inner diameter corresponding to the outer diameter of said inner connecting part and an outer diameter corresponding to the inner diameter of said outer connecting part.

6. An assembly according to claim 1 wherein said annular hollow space of said recess is defined by an annular groove formed in at least one of said inner and outer tubular connecting parts.

7. An assembly according to claim 1 wherein at least one of said inner and outer tubular connecting parts are deformed in order to cause said connecting elements to penetrate the surfaces thereof.

8. An assembly according to claim 1 wherein said annular member extends axially between said pair of projections to occupy said annular hollow space substantially in its entirety.

9. An assembly of parts such as shafts and the like to join together in torque-transmitting relationship a first member and a second member comprising: an inner and an outer tubular connecting part formed, respectively, on each of said first and second members arranged coaxially relative to each other with said outer connecting part being arranged circumferentially around said inner connecting part; said connecting parts being arranged to define therebetween a recess comprising an annular hollow space; a pair of projections arranged axially spaced apart on opposite sides of said recess to define the axial termination of said annular hollow space; and connecting means interposed between said connecting parts within said annular hollow space, said connecting means consisting essentially of an annular member formed separately from said inner and outer tubular connecting parts and inserted therebetween within said recess, said connecting means comprising a plurality of small connecting elements having acuminated portions joined together and arranged circumferentially around said inner connecting part, said connecting elements being formed of a material harder than the material of said connecting parts and operating to penetrate the surfaces of said connecting parts to hold said first and said second members in torque-transmitting relationship; said pair of annular projections consisting of a pair of rings having an inner diameter corresponding to the outer diameter of said inner connecting part and an outer diameter corresponding to the inner diameter of said outer connecting part; at least one of said inner and outer tubular connecting parts being deformed in order to cause said connecting elements to penetrate the surfaces thereof.

* * * * *